March 30, 1943.  A. W. BAIRD  2,314,917
ELECTRIC WELDING APPARATUS
Filed May 22, 1941  2 Sheets-Sheet 1
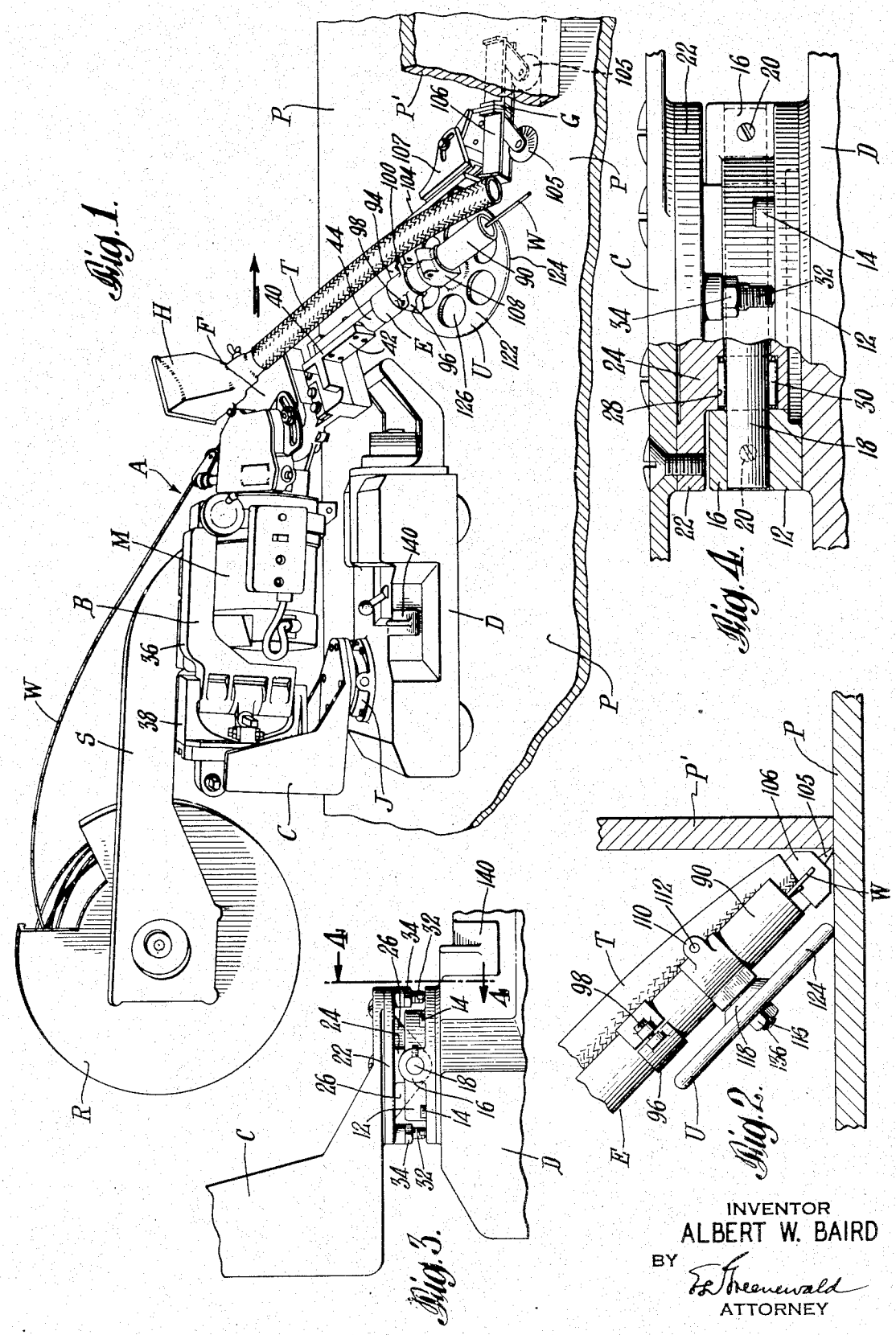
INVENTOR
ALBERT W. BAIRD
BY
ATTORNEY

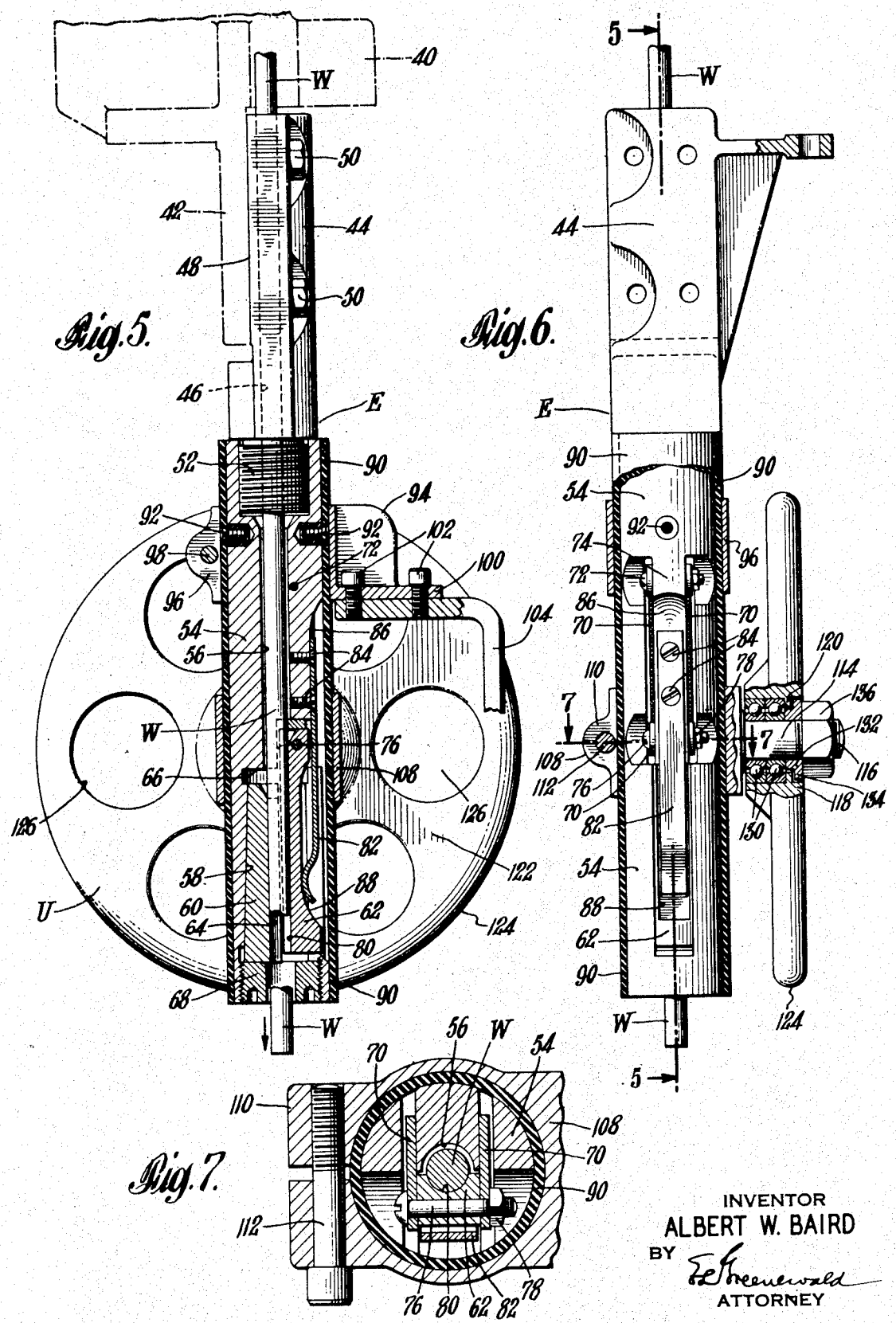

Patented Mar. 30, 1943

2,314,917

UNITED STATES PATENT OFFICE 2,314,917

ELECTRIC WELDING APPARATUS

Albert W. Baird, Elizabeth, N. J., assignor to The Linde Air Products Company, a corporation of Ohio Application May 22, 1941, Serial No. 394,594

8 Claims. (Cl. 219—8)

This invention pertains to electric welding apparatus and more particularly to an improved automatic welding head especially suited to the formation of fillet welds between angularly disposed metal members.

A welding apparatus embodying this invention is particularly adaptable to the welding process described and claimed in United States Patent No. 2,043,960, issued on June 9, 1936, to Lloyd T. Jones et al. In the process disclosed and claimed in this patent, welding is accomplished by passing a high amperage electric current from an electrode to the work to be welded through an inorganic welding material of high electrical resistance when cold and substantially free from substances evolving deleterious amounts of gases; which material is heaped on the line to be welded in such quantity as to completely submerge the welding operation under a blanket of the welding material.

In fillet welding with automatic electric welding apparatus, difficulty has been encountered heretofore in maintaining a constant set position of the welding rod in relation to the fillet, due to waves or surface irregularities in the horizontal member upon which guiding means for the welding apparatus usually rides and to temporary tack welds which may interfere with the operation of the guiding means. Additionally, automatic welding apparatus at present in use is often of such bulk that it is difficult to position the apparatus properly for feeding the welding rod to the fillet at the desired angle while maintaining proper clearance between the welding apparatus and the work to be welded.

It is therefore among the objects of this invention to provide an improved automatic electric welding apparatus particularly suited to forming fillet welds between angularly related metal members to be welded; to provide such an apparatus in which the end of the welding rod is maintained in a set position with respect to the fillet to be welded irrespective of surface irregularities in the member upon which the welding apparatus rides or temporary tack welds encountered by guiding means for the apparatus; to provide such a welding apparatus including co-operating means for guiding the welding rod along the fillet to be welded and for maintaining the set position between the welding rod and the work to be welded; to provide such an apparatus including means for delivering a quantity of a granular fusible welding material to the fillet to be welded; and to provide means readily attachable to existing welding apparatus to adapt the same for making fillet welds.

These and other objects of the invention will in part be obvious and in part become apparent from the following description and accompanying drawings, in which:

Fig. 1 is a perspective view of welding apparatus embodying the principles of the invention as arranged to make a fillet weld between angularly related metal members;

Fig. 2 is an end elevational view of a portion of the apparatus shown in Fig. 1;

Fig. 3 is a side elevational view of an improved rocker hinge forming part of the apparatus shown in Fig. 1;

Fig. 4 is a view, partly in section, on the line 4—4 of Fig. 3, looking in the direction of the arrows;

Fig. 5 is a side elevational view, partly in section, of a bus bar extension forming part of the apparatus shown in Fig. 1, and taken on the line 5—5 of Fig. 6, looking in the direction of the arrows;

Fig. 6 is an end elevational view, partly in section, of the bus bar extension illustrated in Fig. 5; and Fig. 7 is a cross-sectional view taken on the line 7—7 of Fig. 6 and looking in the direction of the arrows.

Generally speaking, the improved electric welding apparatus of the invention comprises a welding rod feeding mechanism and a welding rod magazine or reel mounted as a unit on a suitable moving mechanism by means of which the apparatus may be traversed along a seam or line to be welded. The feeding mechanism and the reel are mounted on the propelling mechanism or motive device through the medium of a pivotal connection, whereby the feeding mechanism and reel may oscillate in a vertical plane relative to the motive device; and, preferably, adjustable means are provided to limit the amount of such oscillation.

For the purpose of making a fillet weld at the intersection of two angularly disposed metal members, the feeding mechanism is provided with a bus bar extension, and mounted on this extension, in adjustably spaced relation to each other, are a guiding device and a rotatable supporting means. The guiding device may include individually pivoted guide rollers, each resiliently urged into engagement with the intersection of the members to be welded, and the supporting means may comprise a large wheel riding on one of the workpieces, and "toed in" toward the intersection of the workpieces. The weight of the feeding mechanism and rod reel is so distributed that the supporting means is urged into engagement with the work, due to the tendency of the feeding mechanism and reel to pivot forwardly about their pivotal connection with the motive device. Preferably, the resilient means urging the guide rollers outwardly into contact with the line to be welded are of insufficient strength to counteract the unbalanced weight of the feeding mechanism and rod reel.

In operation, the feeding mechanism is adjusted so that the bus bar extension and the welding rod extend at a predetermined angle toward the work to be welded. The planes of the guide rollers and supporting wheel are disposed at the same angle to the work as that of the bus bar extension. The guiding device is adjusted along the extension so that the guide rollers engage the intersection of the work members with the end of the extension, and hence the fusing end of the welding rod, at a preselected distance from such intersection. The supporting wheel is then adjusted along the angularly disposed extension, and relatively to the guiding device, until it contacts the work to be welded.

With the described arrangement, the fusing end of the welding rod is maintained a set distance from the intersection of the workpieces as the motive device traverses the welding apparatus along the seam to be welded. The supporting wheel is "toed in" toward the line to be welded, tending to pivot the guide rollers inwardly. However, the resilient means urging the rollers outwardly are sufficiently strong that they counterbalance this tendency and limit inward movement of the bus bar extension. At the same time, the guide rollers can not pivot outwardly any further because, to do so, they would have to move downwardly relative to the supporting wheel. The weight of the welding apparatus would then be on the guide rollers, and, as the resilient means are insufficiently strong to support such weight, the guide rollers cannot move outwardly. Thereby, the fusing end of the welding rod remains a set distance from the line to be welded.

It should be understood that the guide rollers may individually pivot inwardly when encountering tack welds, but, as one or more of the rollers contact the welding line at all times, this individual inward pivoting will not alter the distance between the fusing end of the welding rod and the work. The large wheel riding on the work pivots the feeding mechanism and rod reel about their pivotal connection with the motive device when the wheel rides over undulations in the work. As the guide rollers encounter such undulations at substantially the same instant, the fusing end of the welding rod or wire remains always at a set distance from the welding line.

The embodiment of the invention illustrated in the drawings comprises an automatic electric welding apparatus A and a welding rod reel or magazine R mounted on a suitable moving mechanism or motive device D, whereby the apparatus A and rod reel R may be traversed along a seam to be welded. As shown, the welding apparatus is positioned to form a fillet weld at the intersection of a pair of angularly related plates P and P'.

The apparatus A is similar to that described and claimed in U. S. Patent No. 2,182,575, issued in the names of Albert W. Baird et al. on December 5, 1939, and may comprise a motor M which, through suitable gearing, drives a welding rod feeding means or mechanism F for withdrawing and straightening welding rod or wire W from reel R and feeding it to the work to be welded through a bus bar extension E. The end of the rod or wire W is guided along the line to be welded by the cooperative action of a guiding device G, engaging the intersection of the members to be welded, and a relatively large supporting wheel U riding on one of the members to be welded. Device G and wheel U are adjustably secured to extension E in spaced relation to each other. As described and claimed in the Baird et al. patent, the welding composition of the Jones et al. patent may be deposited on and along the welding line by a hopper H through a tube T, the lower end of which is positioned adjacent to and in advance of the fusing end of rod or wire W.

The large wheel U riding on the work, in cooperation with the guiding means G, maintains the end of the welding rod or wire in fixed position relative to the seam to be welded, and, for this purpose, a special mounting arrangement for apparatus A is provided on the motive device D. As shown, the apparatus A is supported by a bracket B adjustably secured to a bracket C, and the bracket C is mounted on device D by a pivotal connection, such as a rocker hinge J. Rod reel R preferably is mounted on an arm S supported by bracket B. Through the medium of rocker hinge J, apparatus A and reel R may oscillate in a vertical plane with respect to device D in response to undulations of wheel U as it encounters irregularities or waves in the work. Due to the angle of wheel U relative to plate P, the wheel tends to urge the guiding means G inwardly toward plate P, and the weight of the apparatus A and rod reel R is so distributed that the apparatus and reel tend to rock as a unit clockwise about hinge J, as viewed in Fig. 1.

The rod reel or magazine R may be of the type described and claimed in U. S. Patent No. 2,186,070, issued in the names of Albert W. Baird et al. on January 23, 1940, and the motive device D may be a motor driven carriage of the type customarily used for automatic cutting machines.

Referring more particularly to Figs. 1 through 4 of the drawings, the rocker hinge J is mounted on the upper surface of the device D and includes an annular ring 12, secured by studs or bolts 14 to the upper surface of the device D, and formed with upstanding apertured ears 16 in which is mounted a shaft or pintle 18 held against rotation by set screws 20. Secured to the under side of bracket C is a circular plate 22 provided with a rib 24, apertured to receive the shaft or pintle 18, and braced by webs 26 extending between the rib 24 and the under surface of the plate 22. The rib 24 is formed with enlarged recesses 28 in which are mounted roller bearings 30 engaging the shaft or pintle 18. Adjustable means, such as studs 32 provided with lock nuts 34, may be secured to the plate 22 to limit the oscillation of the plate about the shaft or pintle 18.

By the described construction, the automatic welding apparatus A and the rod reel R are free to oscillate a limited amount in a vertical plane with respect to the device D as the wheel U rides over surface irregularities in the plate P. Suitable provision for movement of the welding apparatus and the rod reel in a substantially horizontal plane with respect to the device D is provided by the hinge connection between parts 36 and 38 of the bracket B, and such substantially horizontal movement may be limited or restricted by means of a clamping device, all as described in Baird et al. Patent No. 2,182,575.

The hopper H is mounted on the welding rod feeding mechanism F in any suitable manner, and a tube T is provided of sufficient length to deliver the granular fusible welding material along the seam to be welded. Preferably, the lower end of the tube is disposed between the guiding device G and the lower or fusing end of wire or rod W, whereby the lower end of the tube will closely follow the guiding device along the seam to be welded.

As described in Baird et al. Patent No. 2,182,575, the automatic welding apparatus A is provided with a bus bar 40 formed with a flange 42. In the present invention, the bus bar extension E is secured to the flange 42, and may comprise a first generally elongated tubular member 44 provided with a longitudinally extending passage 46 to receive the welding rod W, as more particularly shown in Figs. 5, 6, and 7. The upper portion of the member 44 is cut away to form a flat surface 48 which is secured to the flange 42 by suitable means such as bolts 50. A threaded extension 52, formed on the lower part of member 44, has secured thereto a second elongated tubular member 54 formed with a passage 56 aligned with the passage 46. The lower portion of the member 54 is cut away to form a substantially rectangular, longitudinally extending recess 58 receiving a fixed current-conducting contact jaw 60 and a movable jaw 62. The fixed contact jaw 60, which is seated in the lower portion of the recess 58, is formed along one surface with a groove 64 of substantially the same shape as the welding rod or wire W, and is maintained in place by being urged toward a shoulder 66 by means such as a nut 68 threaded in the lower end of the member 54. It will be noted that the coacting faces of recess 58 and jaw 60 are inclined or tapered with respect to the center line of member 54, whereby adjustment of nut 68 along member 54 will move jaw 60 longitudinally and laterally with respect to such center line to insure good contact with the rod or wire W.

A pair of flexible metallic conductors 70, are secured by bolt 72 to opposite sides of a projection 74 near the upper end of the recess 58. At their opposite ends, the conductors 70 are secured by a bolt 76 and nut 78 to the movable contact jaw 62, which is formed with a groove 80 of substantially the shape of the welding rod or wire W. Pivotally mounted jaw 62 is urged into engagement with the welding rod or wire W by resilient means such as a leaf spring 82 having a fixed end secured by screws 84 to a depressed portion 86 of the member 54 and a free end engaging a recess 88 in the outer side of the movable jaw 62. The tubular member 54 is surrounded by an insulating sleeve 90 which may be secured thereto by means of screws 92.

Near the upper end of the insulating sleeve 90 is mounted a bracket 94 for adjustably supporting the guiding device G. The bracket 94 may comprise a split clamp 96 operated by a bolt 98, and may be formed with a flange 100 to which may be secured, by means of screws 102, an angle member 104, on the lower end of which is mounted the guiding device G. As the guiding device G is identical with that described and claimed in Baird et al. Patent No. 2,182,575, further description of the same is believed unnecessary, except to state that a plurality of guide rollers 105 are individually pivoted to a slide 106 of the guiding device, and resilient means are provided to urge each roller outwardly into engagement with the intersection of the plates P and P' to guide the welding apparatus along the seam to be welded. While two guide rollers 105 have been shown, more may be provided. The slide 106 is pivotally and adjustably connected to a slide 107, whereby slide 106 may be adjusted parallel to the line to be welded so that guide wheels 105 will each contact the intersection of plates P, P' when the apparatus is positioned to form a fillet weld.

The large supporting wheel U, which rides on the plate P and, in cooperation with the guiding device G, maintains the end of the welding rod or wire W in fixed position with respect to the work, is mounted on a bracket 108 adjustably secured to an intermediate portion of the insulating sleeve 90. The bracket 108 is formed with a split clamp portion 110, secured to the sleeve 90 by means of a screw 112, and a shaft 114 having a reduced threaded extension 116. The wheel U is formed with a hollow hub 118 having an internal annular rib 120, and a web 122 having a rounded rim 124 adapted to engage the plate P. Openings 126 may be formed in the web to lessen the weight of the wheel U.

Roller bearing assemblies 130 are mounted on the shaft 114 and the hub 118 is mounted over the roller bearings, the annular rib 120 maintaining the bearings in proper position. A washer 132, of angular cross-section, engaging the roller bearings and having a flange 134 disposed opposite the annular rib 120, is held in position by means of a nut 136 secured to the reduced threaded extension 116.

In the operation of the device, the plates P and P' are temporarily positioned for welding, as by means of tack welds (not shown). To position the apparatus to make a fillet weld, certain preliminary adjustments must be made. It will be noted that the weight of the apparatus is distributed in such a manner that, as viewed in Fig. 1, the welding apparatus and the rod reel tend to pivot clockwise about the shaft 18 of the rocker hinge J. The feeding mechanism F is first adjusted with respect to the bracket B, as described in Baird et al Patent No. 2,182,575, so that the welding rod or wire W is directed toward the work to be welded at the proper predetermined angle. By loosening the split clamps 96 and 110, the large wheel U and the guiding device G may be positioned properly with respect to one another, so that the wheels 105 of the device G each engage the intersection of the plates P and P' and the large wheel U engages the plate P with the wheels 105 at the intersections of the plates.

Under such conditions, and due to the angle at which the bus bar extension E is directed toward the work, the wheels 105 cannot move outwardly any farther because, in order to do so, they must move downwardly. Downward movement of wheels 105 is impossible because the spring tension on the wheels is insufficient to counteract the weight of the welding apparatus tending to move the bus bar extension E downwardly and the wheels 105, therefore, inwardly. The weight of the apparatus is carried by the large wheel U which rides along the plate P. This wheel is "toed in" toward the intersection of the plates P and P' so that it tends to maintain the small guide wheels 105 in engagement with the intersection of the plates P and P'. The large wheel U will not move the bus bar extension E toward the intersection of the plates any further than the desired set distance, because, to do so, would require the small wheels 105 to move upwardly along the plate P'. The combination of the large wheel U and the guiding device G thereby maintains the fusing end of the welding rod or wire W at a fixed distance from the seam to be welded. As the welding apparatus moves along the work, the wheels 105, in encountering tack welds, will individually pivot inwardly and ride over such tack welds without disturbing the setting of the rod with respect to the work.

The rocker hinge J plays an important part in the function of the apparatus by permitting the welding apparatus A and the rod reel R to oscillate in a vertical plane with respect to the motive device D as the wheel U encounters waves or other surface irregularities in the work to be welded. As the wheels 105 encounter these undulations at substantially the same instance, the fusing end of rod W remains the set distance from the work. The amount of permissible oscillation is determined in accordance with conditions to be encountered and is limited through adjustment of the studs 32 and the lock nuts 34. For this purpose, lock nuts 34 are loosened and studs 32 adjusted to permit the welding apparatus and reel to oscillate an amount sufficient to provide for the largest undulation to be encountered.

When all the adjustments have been made, such as the angle at which the welding wire or rod is fed to the seam, the amount of permissible oscillation about the hinge J and the proper relative adjustment of the wheel U and guiding device G with respect to one another have been made, the motive device D is energized to move the apparatus along the seam to be welded and the motor M is energized to feed the welding wire or rod W toward the work through the medium of the feeding mechanism F. As the apparatus traverses the work, the wheel U rides along the plate P and sustains the weight of the welding apparatus. The wheels 105 of the guiding device G engage the intersection of the plates to be welded and, in cooperation with the wheel U as described above, maintain the end of the bus bar extension E at a desired fixed distance from the work. When a tack weld is encountered, each wheel 105 individually pivots away from the intersection to ride over the tack weld without disturbing the setting of the apparatus as a whole. Thereby, a uniform high quality fillet weld is produced between the plates P and P'.

Electric current for welding may be brought by suitable cables (not shown) to the bus bar 40 which is electrically connected to the tubular member 44, which is in turn electrically connected to the tubular member 54. The fixed contact jaw 60 is in engagement with the tubular member 54 and electric current is thereby conducted thereto. Electric current is also conducted to the movable contact jaw 62 by means of the conductors 70 which are secured to the member 54 and the contact jaw 62. Leaf spring 82 maintains the movable contact jaw in engagement with the welding rod and the welding rod in engagement with the fixed contact jaw 60.

To permit bodily moving of the entire unit from one location to another, device D is formed with lugs 140 to which may be secured a chain sling or other lifting device mounted on a crane. When such bodily movement is to be undertaken, studs 32 are adjusted to hold apparatus A and reel R rigidly against movement relative to device D, thereby preventing undesirable oscillation of the respective parts of the apparatus and swinging of the apparatus as a whole.

While, for purpose of illustration, a specific embodiment of the apparatus of the invention has been described and shown, it will be obvious to those skilled in the art that the invention may be otherwise embodied and the dimensions and interrelation of parts changed within the scope of the appended claims.

What is claimed is:

1. Electric fillet welding apparatus comprising, in combination, a motive device for traversing said apparatus along a seam to be welded; a welding rod reel; a feeding mechanism for feeding welding rod from said reel toward the line to be welded; means for conducting electric welding current to said welding rod; means pivotally supporting said reel and said feeding mechanism on said device for oscillation as a unit in a vertical plane, the weight of said reel and feeding mechanism being so distributed that said reel and feeding mechanism tend to tip forwardly about such pivotal supporting means; and means for guiding said apparatus along the intersection of a pair of angularly disposed plates to be weld united by a fillet weld, said guiding means including a member secured to said feeding mechanism and rotatably engaging one of the members to be welded to support a portion of the weight of said reel and feeding mechanism.

2. Electric fillet welding apparatus as claimed in claim 1, in which said motive device is formed with lugs to which may be secured a lifting device; and adjustable means to hold said reel and feeding mechanism rigidly against movement relative to said device, so that said apparatus may be lifted as a rigid unit through the medium of said lugs.

3. Electric fillet welding apparatus as claimed in claim 1, in which such current conducting means includes an elongated bus bar extension secured to said feeding mechanism and constructed to receive such welding rod and conduct welding current to such rod; said guiding means being adjustably mounted on said bus bar extension.

4. Electric welding apparatus comprising, in combination, means for feeding a welding rod toward the work to be welded; a bus bar mounted on said feeding means; means to conduct electric current to said bus bar; a first elongated member secured, in electrically conductive relation, to said bus bar and formed with a passage to receive such welding rod; a second elongated member secured, in electrically conductive relation, to said first elongated member and formed to receive such welding rod; a fixed contact jaw adjustably mounted in said second member and electrically connected thereto; a movable contact jaw pivotally mounted in said second member and electrically connected thereto; and resilient means urging said movable contact jaw into engagement with such welding rod and such welding rod into engagement with said fixed contact jaw.

5. Electric welding apparatus as claimed in claim 4, including means movable longitudinally of said second member and abutting said fixed contact jaw to adjust said contact jaw longitudinally and laterally of said second member.

6. Electric welding apparatus as claimed in claim 4, in which said second member and said fixed contact jaw are formed with coacting tapered surfaces; and means threadedly engaging said second member and abutting said fixed contact jaw to adjust the same relative to said second member.

7. Means for guiding electric welding apparatus along the line of intersection of angularly disposed work members to make a fillet weld uniting said members, said means comprising, in combination, a welding rod engaging member directed at an angle toward such line of intersection; a guiding device secured to said member; rollers pivotally mounted on said guiding device; means resiliently urging said rollers outwardly into engagement with said line of intersection; and supporting means, secured to said member and rotatable in a plane parallel to the plane of rotation of said rollers, said supporting means engaging one of the members to be welded at an angle to such member when said rollers are in contact with such line of intersection.

8. Guiding means as claimed in claim 7, in which said guiding device and said supporting means are adjustably mounted on said member for adjustment relatively to each other.

ALBERT W. BAIRD.